(12) United States Patent
Ward

(10) Patent No.: US 8,934,579 B2
(45) Date of Patent: Jan. 13, 2015

(54) LOCATION SYSTEM

(75) Inventor: Andrew Martin Robert Ward, Great Shelford (GB)

(73) Assignee: Ubisense Limited, Chesterton (GB)

(*) Notice: Subject to any disclaimer, the term of this patent is extended or adjusted under 35 U.S.C. 154(b) by 149 days.

(21) Appl. No.: 13/383,075

(22) PCT Filed: Jul. 2, 2010

(86) PCT No.: PCT/EP2010/059505
§ 371 (c)(1),
(2), (4) Date: Mar. 8, 2012

(87) PCT Pub. No.: WO2011/003841
PCT Pub. Date: Jan. 13, 2011

(65) Prior Publication Data
US 2012/0163421 A1 Jun. 28, 2012

(30) Foreign Application Priority Data

Jul. 10, 2009 (GB) .................................. 0912082.5
Aug. 21, 2009 (GB) .................................. 0914700.0

(51) Int. Cl.
*H04L 27/06* (2006.01)
*G01S 13/76* (2006.01)
*G01S 5/14* (2006.01)
*G01S 7/00* (2006.01)
*G01S 13/02* (2006.01)
*G01S 13/87* (2006.01)

(52) U.S. Cl.
CPC ................. *G01S 13/765* (2013.01); *G01S 5/14* (2013.01); *G01S 7/003* (2013.01); *G01S 13/0209* (2013.01); *G01S 13/878* (2013.01)
USPC ........... 375/340; 375/145; 375/146; 375/149; 375/316

(58) Field of Classification Search
CPC ......... G01S 13/765; G01S 5/14; G01S 7/003; G01S 13/0209; G01S 13/878
USPC .......................................... 375/145, 149, 340
See application file for complete search history.

(56) References Cited

U.S. PATENT DOCUMENTS

| 5,420,883 A | 5/1995 | Swensen et al. |
| 5,510,800 A | 4/1996 | McEwan |

(Continued)

FOREIGN PATENT DOCUMENTS

JP WO2007055350 * 5/2007 .............. H04L 25/49

OTHER PUBLICATIONS

International Search Report and Written Opinion Issued in PCT/EP2010/059505, Sep. 6, 2010; 18 pages.

*Primary Examiner* — Dhaval Patel
(74) *Attorney, Agent, or Firm* — Rothwell, Figg, Ernst & Manbeck PC

(57) ABSTRACT

A receiver for receiving a signal, the signal conforming to a protocol such that the signal comprises a synchronising portion and a data portion, each portion comprising pulses located in respective time slots, the time offsets between successive time slots being defined by the protocol, the receiver comprising: a detector configured to detect a first pulse and a second pulse of the synchronising portion; a comparison module configured to compare the time offset between the first and second pulses to a corresponding time offset defined by the protocol so as to determine the relationship between the detected time offset and the corresponding time offset; a determination module configured to determine expected times of arrival of the time slots of the data portion using the determined relationship and the time offsets defined by the protocol; and a data reader configured to read data conveyed in the data portion at the expected times of arrival.

12 Claims, 3 Drawing Sheets

(56) References Cited

U.S. PATENT DOCUMENTS

| | | |
|---|---|---|
| 5,901,172 A | 5/1999 | Fontana et al. |
| 6,812,824 B1 | 11/2004 | Goldinger et al. |
| 7,492,316 B1 | 2/2009 | Ameti et al. |
| 7,933,306 B2 * | 4/2011 | Yamamoto ............... 375/130 |
| 2006/0017545 A1 | 1/2006 | Volpi et al. |
| 2009/0067552 A1 * | 3/2009 | Miscopein et al. .......... 375/341 |
| 2011/0274141 A1 * | 11/2011 | Jantunen et al. ............ 375/138 |

* cited by examiner

US 8,934,579 B2

LOCATION SYSTEM

CROSS REFERENCE TO RELATED APPLICATION(S)

This application is a 35 U.S.C. §371 National Phase Entry Application from PCT/EP2010/059505, filed Jul. 2, 2010, designating the United States and also claims the benefit of Great Britain Application No. 0912082.5, filed Jul. 10, 2009 and Great Britain Application No.: 0914700.0, filed Aug. 21, 2009, the disclosures of which are incorporated herein in their entirety by reference.

FIELD OF THE INVENTION

The invention relates to a receiver for receiving a signal that comprises a synchronising portion and a data portion, and a transmitter for transmitting the same. In particular, the invention relates to a location system in which a transmitter transmits such a signal by means of which it can be located by receivers of the location system.

BACKGROUND OF THE INVENTION

Ultrawideband (UWB) radio is a communications technology which uses very high bandwidth radiofrequency (RF) signals. UWB radio technology is commonly used in location sensing applications because the UWB signals enable high location and ranging precision compared to traditional radio systems.

Typically, tags are attached to the objects to be located, and a network of sensors is placed at known points in the environment. UWB signals emitted by the tags are detected by the sensors, which use them to determine measurements such as the distance from the tag to the sensor. Processing logic can then combine the known sensor positions and the measurements to determine a 2D or 3D position for the tag. Typical UWB location systems are accurate to within a few tens of centimetres, even within environments that are normally challenging for radiolocation systems, for example those with many metal reflective surfaces.

U.S. Pat. No. 5,510,800 describes a UWB receiver used in position determination applications. The receiver is designed to detect a train of broadband radio pulses sent to it by a UWB transmitter. The receiver detects the presence or absence of the incoming train of UWB pulses, and measures the time-of-arrival of the pulses. It uses a sampling gate in the receiver to mix a replica of the expected incoming pulse with the incoming signal. The mixer has a high output response when it is triggered with a pulse replica at the exact moment when a pulse arrives at the receiver, and a low response if it is triggered when no pulse arrives at the receiver. The time-of-arrival of a received pulse is measured to be that at which the amplified output response of the sampling gate exceeds a predetermined threshold.

In the main embodiment of U.S. Pat. No. 5,510,800 the transmitter and receiver are tethered together by a cable, and the transmitted pulse train and replica pulse train are driven by the same clock located at the receiver. Consequently, the pulse repetition frequency (PRF) of the replica pulse train exactly matches the PRF of the transmitted pulse train. The receiver does not initially know at what instant an incoming pulse will arrive at the receiver since this depends on the distance between the transmitter and receiver. It therefore shifts the time at which the replica pulse train drives the sampling gate across the full pulse repetition period of the pulse train, thereby ensuring that the replica and incoming pulse trains coincide at the receiver at some time.

In applications where the transmitter and receiver are not physically connected, a clock at the transmitter drives the transmitted pulse train and a different clock at the receiver drives the replica pulse train. All clocks drift relative to each other to some degree. Consequently, a mismatch will develop between the PRF of the transmitted pulse train and the PRF of the replica pulse train dependent on the degree of drift between the transmitter and receiver clocks.

Additionally, the system described in U.S. Pat. No. 5,510, 800 is limited in that the transmitted signal lacks the capacity to convey information about the transmitter. It is desirable to convey information such as the identity of the transmitter, particularly in cluttered environments in which the transmitter and receiver are not physically connected.

U.S. Pat. No. 5,901,172 describes another UWB receiver. The receiver is designed to detect single, individual pulses within a UWB pulse train as and when they are received, as opposed to only detecting pulses that match a replica pulse train as in U.S. Pat. No. 5,510,800. This type of receiver is known in the art as a non-coherent receiver. A non-coherent UWB receiver can be used with an appropriate transmitter to transfer data from the transmitter to the receiver. Since the receiver detects each pulse in isolation, only one pulse may be used to transfer each bit of data. This method of data transfer in UWB systems is problematic for the following reason. Broadband pulses used in UWB systems typically occupy a bandwidth of hundreds to thousands of Megahertz in regions of the radio spectrum below 10.6 GHz. These regions have already been allocated by regulators to other services. The output powers of UWB transmitters are consequently normally limited by regulatory restrictions to extremely low levels, so as to limit potential interference from a UWB transmitter to other users. However, a pulse of a UWB signal sent from a non-coherent receiver needs to have sufficient energy that a receiver can accurately detect and decode the bit transferred by the pulse. The range of distances over which the transmitter can successfully transmit data to a non-coherent receiver is therefore severely limited.

There is thus a need for an improved UWB receiver which is able to successfully convey data over longer distances and that does not suffer from mismatches between the clocking at either end of the communication channel.

SUMMARY OF THE INVENTION

According to a first aspect of the present invention, there is provided a receiver for receiving a signal, the signal conforming to a protocol such that the signal comprises a synchronising portion and a data portion, each portion comprising pulses located in respective time slots, the time offsets between successive time slots being defined by the protocol, the receiver comprising: a detector configured to detect a first pulse and a second pulse of the synchronising portion; a comparison module configured to compare the time offset between the first and second pulses to a corresponding time offset defined by the protocol so as to determine the relationship between the detected time offset and the corresponding time offset; a determination module configured to determine expected times of arrival of the time slots of the data portion using the determined relationship and the time offsets defined by the protocol; and a data reader configured to read data conveyed in the data portion at the expected times of arrival.

Suitably, the detector is configured to detect the first and second pulses by detecting a first group of pulses comprising the first pulse and a second group of pulses comprising the second pulse, and wherein the comparison module is configured to compare the time offset between the first and second pulses to a corresponding time offset defined by the protocol by comparing the time offset between the first group of pulses and the second group of pulses to the corresponding time offset defined by the protocol.

Suitably, the data reader is configured to read data by virtue of the omission of pulses from one or more of the time slots in the data portion.

Suitably the receiver further comprises a signal processor configured to process the signal so as to determine the time-of-arrival of one or more of the pulses.

Suitably the receiver further comprises: a replica pulse generator configured to generate a replica series of pulses, each pulse offset from the next by a time e; a mixer configured to mix the replica series with the received signal and output the mixed signal to the detector; the detector being configured to detect a pulse of the received signal if that pulse is input to the mixer coincident with a pulse of the replica series.

Suitably, the replica pulse generator is configured to generate further replica series of pulses, each pulse in each series being offset from the next by a time e, each series being offset from the next by a time f, where f is not an integer multiple of e.

Suitably, the comparison module is configured to compare the time offset between the first and second pulses to a corresponding time offset defined by the protocol by: determining the offset between a first replica series of pulses that coincides with the first pulse and a second replica series of pulses that coincides with the second pulse; and comparing this offset to the corresponding offset defined by the protocol.

Suitably, the replica pulse generator is configured to refine the time e so as to generate a pulse of the replica series of pulses at each of the expected times of arrival of the time slots of the data portion.

Suitably, the receiver further comprises an integrator configured to integrate successive pulses of the data portion, the data reader being configured to read the integrated data output from the integrator.

Suitably, the receiver is a part of a location system for estimating the location of a transmitter of the signal by means of the receiver.

According to a second aspect of the present invention, there is provided a transmitter for transmitting signals by means of which the transmitter can be located, the transmitter being configured to repeatedly transmit blocks of the following format: a synchronising portion comprising a series of pulses, each pulse being located in a respective time slot and each time slot being offset from the next by a time b; and a data portion subsequent to the synchronising portion, the data portion comprising a series of pulses, each pulse being located in a respective time slot and each time slot being offset from the next by a time c; wherein the pulses of the data portion convey data.

Suitably, each data bit of the data portion is conveyed by a plurality of pulses of the data portion.

Suitably, the pulses of the data portion convey data by virtue of the omission of pulses from one or more of the time slots.

BRIEF DESCRIPTION OF THE DRAWINGS

The present invention will now be described by way of example with reference to the accompanying drawings. In the drawings.

DESCRIPTION OF THE PREFERRED EMBODIMENTS

Figure 1:
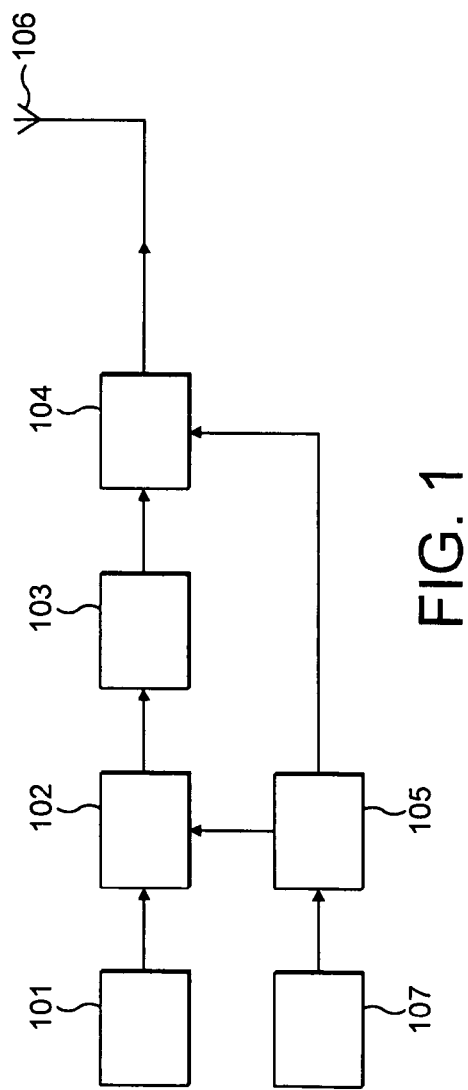
FIG. 1 illustrates a schematic diagram of a transmitter according to the present invention.

FIG. 1 shows a schematic diagram of the general arrangement of a UWB transmitter.

The transmitter comprises a pulse train generator 101, the output of which is gated by an AND gate 102 and a gating signal controlled by a microprocessor 105. The microprocessor 105 is clocked by transmitter clock 107. The pulse train generator is used to trigger a UWB pulse generator 103. The output of the UWB pulse generator is filtered by a signal conditioning block 104 under the control of the microprocessor 105. The output of the signal conditioning block 104 is transmitted by UWB antenna 106.

Figure 2:
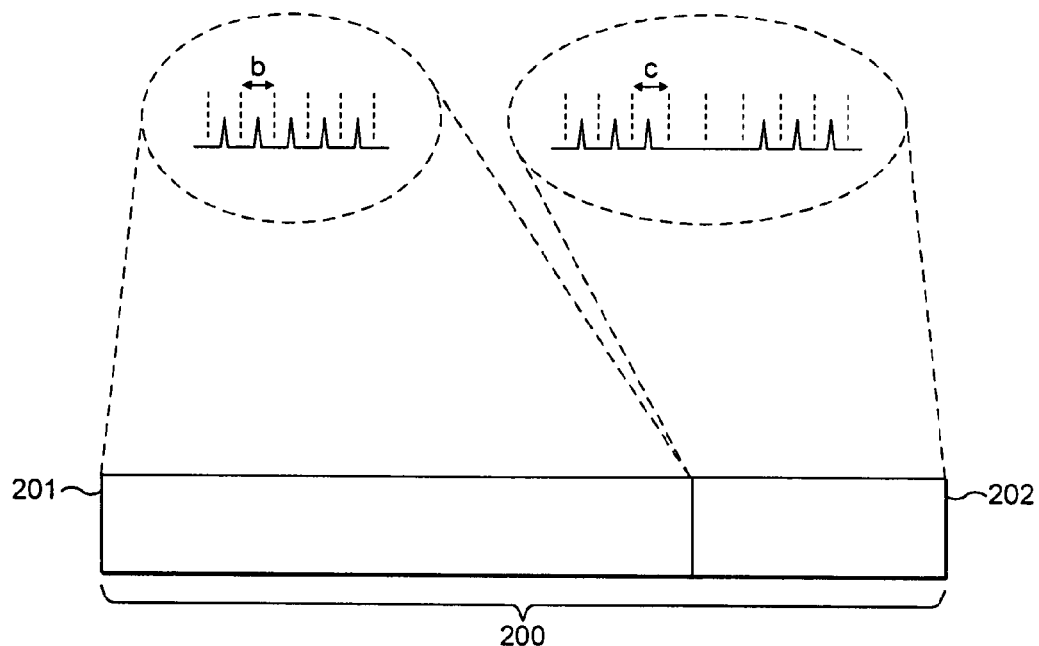
FIG. 2 illustrates a diagram of a UWB signal block according to the present invention.

FIG. 2 illustrates a typical UWB signal block 200 suitable for being generated and transmitted by the transmitter. The transmitter repeatedly transmits signal blocks of this format. The block 200 comprises two portions. The first portion 201 of the signal is preferably a continuous pulse train. This continuous pulse train is used by the receiver to lock onto the signal and to synchronise the replica pulse train generated by the receiver with the signal received from the transmitter. The second portion 202 of the signal subsequent to the first portion 201 is a series of pulses used to convey data to the receiver. For example, data portion 202 may comprise data indicating the identity of the transmitter and/or data indicating the battery level of the transmitter. Preferably, data portion 202 is also a continuous pulse train.

Suitably, the pulse train generator 101 of FIG. 1 generates a pulse train trigger signal at a frequency of 6.5 MHz. The gating signal controlled by the microprocessor consists of a continuous HIGH level for an extended period followed by a set of HIGH/LOW level periods. The continuous HIGH level is used to generate the continuous pulse train of the synchronising portion 201 of the signal block shown in FIG. 2. The HIGH/LOW levels represent a series of I/O bits which comprise a data message assembled by the microprocessor 105. This data message is used to form the data portion 202 of the signal block shown in FIG. 2. The duration of the synchronising and data portions of the signal block are determined by the lengths of the various portions of the gating signal. These are dependent on the particular application being implemented. Suitably, the continuous HIGH level period is 5 ms long. Suitably, the set of HIGH/LOW level periods are each 25 µS long. The total length of the data portion is dependent on the number of bits being transmitted by the system.

The pulse train trigger signal gated by the gating signal is used to trigger the UWB pulse train generator 103. The UWB pulse train generator generates a UWB pulse train of the format described with relation to FIG. 2 at a frequency of, for example, 7 GHz. The output of the UWB pulse generator 103 is filtered by a signal conditioning block 104 to meet regulatory requirements. The signal conditioning block 104 may optionally include a variable gain amplifier or variable attenuator, controlled by the microprocessor 105, which can be used to change the relative pulse output power in the different portions of the transmitted signal.

The format of the synchronising portion and data portion of the transmitted signal will now be described with reference to FIG. 2.

The synchronising portion 201 comprises a series of pulses, each pulse being located in a respective time-slot and each time-slot being offset from the next by a time b. The data portion 202 comprises a series of pulses, each pulse being located in a respective time slot and each time-slot being offset from the next by a time c. Typically, b and c are the same. However in some implementations b is smaller than c. The first time slot of the data portion 202 is offset from the beginning of the signal block 200 by a known time defined by the system's protocol. Preferably each bit of data is conveyed by a plurality of pulses in the data portion 202.

A suitable modulation scheme for encoding the data is on-off keying (OOK). In OOK, the transmitter gates the transmission of its output pulse train based on whether the data bits to be sent are '0' or '1'. Preferably, a plurality of pulses convey each data bit. For example, 3 consecutive pulses may be transmitted to indicate the data bit '1', and 3 consecutive pulses may be omitted to indicate the data bit '0'. The rate at which bits are superimposed via OOK on the transmitted pulse train is known to both the transmitter and receiver(s) of the location system. In other words, the on-off gate period of the OOK and the pulse rate of the transmitted pulse train are both defined by the system's protocol. Hence, the number of pulses used to convey each bit is defined by the system's protocol. Optionally, the on-off gate period matches the pulse rate, in which case each data bit is indicated by a single pulse.

The transmitted signal conforms to a protocol in which the values of b and c are defined.

Figure 3:
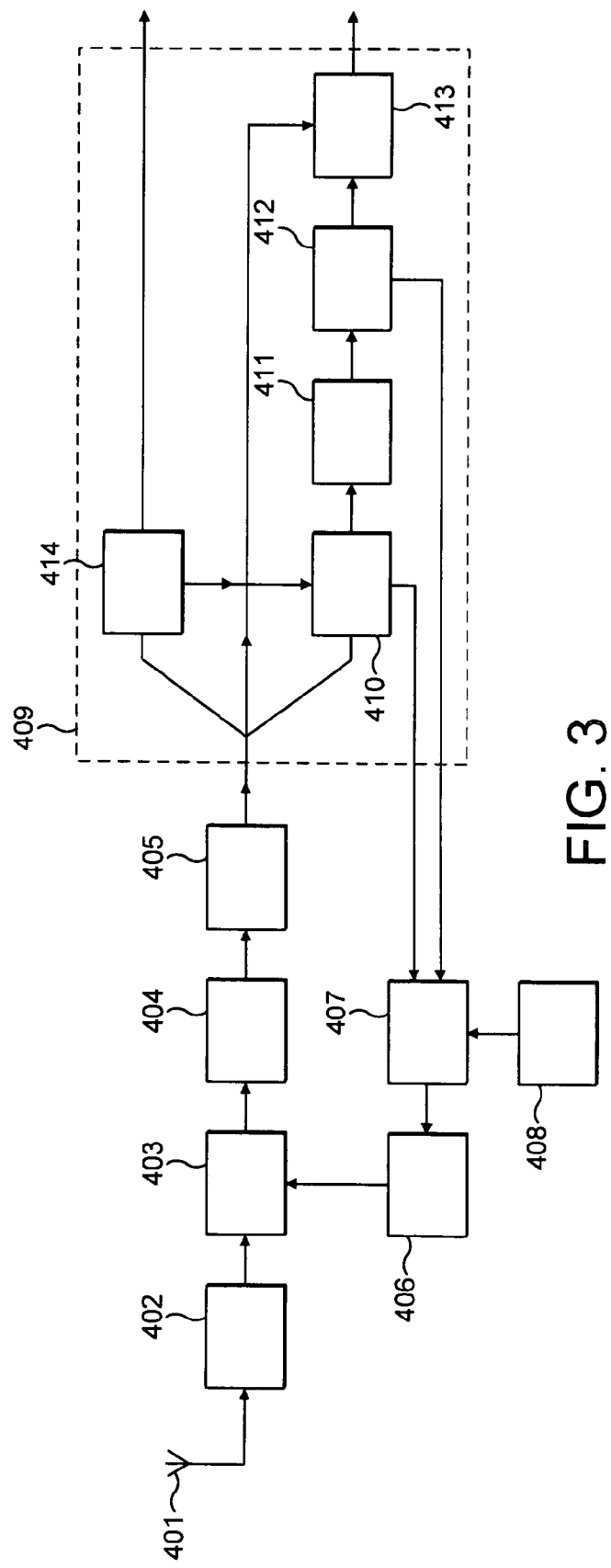
FIG. 3 illustrates a schematic diagram of a receiver according to the present invention.

FIG. 3 shows a schematic diagram of the general arrangement of a coherent receiver according to an embodiment of the present invention.

The receiver comprises a UWB antenna 401 whose output is amplified and filtered by a radio-frequency signal conditioning module 402. The output of the signal conditioning module is input to the radio frequency (RF) port of a mixer 403. A local oscillator port of the mixer 403 is fed from a replica UWB pulse generator 406. The mixer mixes the incoming UWB signal with a replica UWB signal from the replica UWB pulse generator 406. The output of the mixer 403 is an audio frequency baseband signal which is input to an integrator and signal conditioning module 404. The output of the integrator and signal conditioning module 404 is input to an analogue-to-digital converter (ADC) 405. The sampled ADC data is passed to a digital signal processor (DSP) 409 for processing.

The replica UWB pulse generator 406 is triggered by a programmable trigger source 407. The programmable trigger source 407 may be a ramp generator/comparator combination, direct digital synthesiser, or other mechanism which permits the phase of its output signal to be varied arbitrarily, and is supplied with a clock signal from receiver clock 408. Suitably, the receiver clock is a high accuracy base clock generated from a temperature compensated crystal oscillator. The programmable trigger source 407 is controlled by signals from the DSP 409 to adjust the phase of the trigger source output signal. According to the receiver clock 408, the clock signal is generated at the same frequency as the transmitter clock signal. For example, if the transmitter clock generates a clock signal at 6.5 MHz, then the receiver clock generates a clock signal at 6.5 MHz.

The sampled ADC data input to the DSP 409 is fed to a signal analyser 414, a data reader 413 and a detector 410. The DSP 409 further comprises a detector 410, comparison module 411 and determination module 412.

The operation of the receiver apparatus of FIG. 3 will now be described with reference to a UWB signal of the format described in relation to FIG. 2.

The transmitter and receiver are synchronised via an external timing device. Typically this device communicates wirelessly with the transmitter and/or receiver. The device indicates the start of the signal block to the transmitter and/or receiver. This allows the receiver to synchronise to the data portion, since the data portion follows the beginning of the message by a known time defined by the system's protocol.

After reception by the antenna 401, and amplification and filtering by signal conditioning module 402, the received signal is passed to the RF port of mixer 403. The Local Oscillator (LO) port of the mixer is fed from replica UWB pulse generator 406 which is triggered by programmable trigger 407 under the control of DSP 409 to replicate the output of the UWB transmitter.

Figure 4:
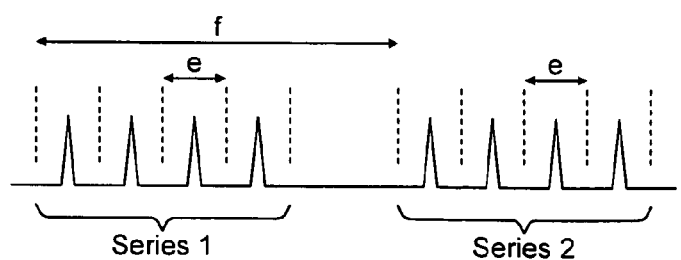
FIG. 4 illustrates a diagram of two adjacent series of replica pulses.

The offset of one pulse of the synchronising portion of a UWB signal block to the next pulse is known to the DSP 409 to be the time b. The DSP 409 controls the programmable trigger 407 to send triggers to the replica UWB pulse generator such that the replica UWB pulse generator generates a pulse train in which each pulse is offset from the next by a time e. The time e is initially the same as time b as measured by the receiver clock 408. The DSP 409 controls the programmable trigger to generate a plurality of series of replica pulses. Each series is offset from the next by a time f. As illustrated in FIG. 4, f is the offset between the beginning time slot of one series of pulses and the beginning time slot of the next series of pulses. (Each series is shown consisting of only 4 pulses for ease of illustration). f is not an integer multiple of e. In this way, the receiver shifts the sampling window of the receiver, i.e. the time for which the mixer is active. The phase step of the receiver, i.e. the shift between the first pulse of a series and the position that pulse would have been in had it been a continuation of the previous series, is given by:

$$\frac{f}{e} - \left\lfloor \frac{f}{e} \right\rfloor$$

where $\lfloor \ \rfloor$ denotes the floor operator which maps a number to the next smallest integer.

Initially, the receiver sweeps the sampling window over at least the period of one phase cycle of the transmitter clock. This allows the receiver to detect the incoming UWB signal by ensuring that the receiver's sampling window matches the time-of-arrival of a pulse of the synchronising portion of the incoming UWB signal at least one point during reception of the synchronising portion of the UWB signal block. The mixer has a high output response when it is triggered with a replica pulse at the exact moment when a received pulse arrives at the receiver, and a low response if it is triggered when no pulse arrives at the receiver. The high output response when the receiver's sampling window matches the time-of-arrival of a pulse of the incoming UWB signal is detected by the detector 410 in the DSP 409. The signal analyser 414 analyses the detected pulse so as to determine its time-of arrival precisely. The detector uses the determined time-of-arrival to control the programmable trigger 407 to lock onto the pulse train in the synchronising and or data portions of the UWB signal. The programmable trigger is controlled to stop the shift of the sampling window and to trigger a series of pulses offset from each other by a time e, the first pulse being offset from the time-of-arrival of the detected pulse by a time e (or an integer multiple of e).

The time required to perform the sweep will depend on a number of parameters. One of these parameters is the pulse repetition frequency (PRF) of the UWB transmitter. A lower PRF implies a longer interval between pulses, which if the time window over which the sampling gate responds is fixed, implies a longer sweep time. Another parameter is the integration time of the coherent UWB receiver. A longer integration time means that the replica pulse train dwells at a particular phase for a longer time, thereby increasing the length of the sweep time. Another parameter is the effective time window over which the sampling gate is open. A longer time window means that fewer sweep steps are used to align the incoming and replica pulse trains to a sufficient degree of accuracy to detect a signal, implying a shorter sweep time.

Preferably, the receiver performs a second sweep over at least the period of one phase cycle of the transmitter clock. The DSP compares the first and second sweep in order to determine the drift between the transmitter clock and the receiver clock. The detector 410 of the DSP detects a pulse during each sweep of the synchronising portion. Optionally, the second sweep is terminated once a pulse has been detected. The phase shift relative to the receiver clock of the replica pulse series of the sweep which coincides with each detected pulse is determined. The difference between the phase shifts associated with the two pulses gives the drift between the transmitter and receiver clocks over the time period between the two sweeps.

The determination module 412 of the DSP uses the measurement of the drift of the transmitter and receiver clocks, the known times b and c, the known time after the beginning of the signal at which the data portion begins, and the known time-of-arrival of at least one pulse to calculate times at which each expected pulse of the data portion (and optionally the synchronising portion) should arrive according to the receiver clock. The DSP controls the programmable trigger 407 to trigger the replica pulse generator 406 such that it refines the time interval between one replica pulse and the next so that the replica pulses remain aligned with the pulses of the incoming UWB signal despite the drift between the transmitter and receiver clocks. As an alternative to this continuous adjustment, the receiver may periodically adjust the receiver clock to account for the drift between the transmitter and receiver clocks.

If the ratio of time as measured by the transmitter clock to time as measured by the receiver clock is not constant, then the calibration discussed above is repeated at a later point in time.

In order that the synchronising portion of the signal is sufficiently long for the receiver to perform two sweeps, the length of the synchronising portion is equal to or greater than the ratio of (twice the offset of successive time slots in the synchronising portion (b)) to (the phase step of the receiver).

The DSP 409 adjusts the output of the programmable trigger source 407 such that the active period of the mixer 403 matches the expected time-of-arrival of the time slots of the data portion.

The received data pulses are input to integrating circuit 404. The integrating circuit 404 integrates a number of pulses which arrive at the receiver over a period determined by the time constant of the integrator. This time constant is chosen such that the pulses conveying a first data bit are integrated in a first period, and the pulses conveying a second data bit are integrated in a second period, and so on. This time constant is defined by the system's protocol. The integrated signal is output to the data reader 413 in the DSP for signal detection and analysis (for example presence/absence, phase shift, polarity). The advantage of integrating the signal is that the energy contained in multiple pulses is combined at the receiver. The total combined energy of the pulses is used by the data reader to determine whether the data bit is a '1' or a '0'. Since UWB signal transmissions are subject to low power regulations, the discrimination of a data bit as '1' or '0' from a single UWB pulse is inaccurate over long transmission ranges since it is difficult to distinguish between a UWB pulse and noise/interference. By integrating the energy received over a period of time, the receiver described herein can more accurately distinguish between the UWB pulses and noise/interference. Consequently, each individually received pulse can have a low energy and the data transferred on that pulse be readily detected by the receiver. The range over which a signal can be sent and successfully detected and decoded within the regulatory low power requirements is increased using the receiver described herein compared to the non-coherent receiver described in the background to this invention. The data transfer rate will however be slower since more pulses are used to transmit each data bit.

Since the pulses in the pulse train 201 are substantially identical, the signal analyser 414 of the DSP is able to examine the characteristics of a number of pulses as if they were the same pulse. In other words, detailed measurements (such as the phase of an incoming pulse) can be achieved by making repeated measurements on different pulses in the pulse train, and combining these measurements to form an overall picture of a single pulse. This allows for a very accurate determination of, for example, the angle-of-arrival of the UWB signal.

The DSP passes the analysis data along with the data bits decoded by the data reader to other systems for further processing.

In a suitable implementation, the received pulses of the synchronising portion are also input to integrating circuit 404. The integrating circuit 404 integrates a number of pulses which arrive at the receiver over a period determined by the time constant of the integrator. During the first and second sweeps of the synchronising portion, the receiver detects two groups of pulses. The phase shift relative to the receiver clock of the replica pulse series of the sweep which coincides with each detected group of pulses is determined. This phase shift is used as described above to determine the drift between the transmitter and receiver clocks over the time period between the two sweeps, and to determine expected times of arrival of the time slots of the data portion (and optionally the synchronising portion).

A suitable implementation of the described system of the transmitter and receiver is a location system for determining the location of the transmitter. In such an implementation, the transmitter repeatedly transmits UWB signal blocks of the format described in relation to FIG. 2. Suitably, the data portion of the block 202 comprises one or more of the following data: a known preamble, the identity of the transmitter, battery voltage data, and cyclic redundancy check (CRC) bits. Suitably, this data is transmitted using the OOK scheme previously described. The DSP of the receiver is able to determine accurate measurements such as the time-of-arrival and angle-of-arrival of the pulses. The determination of the time-of-arrival and/or angle-of-arrival of pulses at a number of receivers (or a number of antennas of the same receiver) whose positions are known can be used to locate the position of the transmitter.

FIGS. 1 and 3 are schematic diagrams of the transmitter and receiver described herein. The method described does not have to be implemented at the dedicated blocks depicted in these figures. The functionality of each block could be carried out by another one of the blocks described or using other apparatus. For example, the method described herein could be implemented partially or entirely in software.

The applicant draws attention to the fact that the present invention may include any feature or combination of features disclosed herein either implicitly or explicitly or any generalisation thereof, without limitation to the scope of any of the present claims. In view of the foregoing description it will be evident to a person skilled in the art that various modifications may be made within the scope of the invention.

The invention claimed is:

1. A receiver for receiving a signal, the signal conforming to a protocol such that
the signal comprises a synchronising portion and a data portion, each portion comprising pulses located in respective time slots, the time offsets between successive time slots being defined by the protocol, the receiver comprising:
a replica pulse generator configured to generate first and second replica series of pulses, each pulse offset from the next by a time e, and each series being offset from the next by a time f, where f is not an integer multiple of e;
a mixer configured to mix the replica series with the received signal and output the mixed signal to a detector;
the detector configured to detect a first pulse and a second pulse of the synchronising portion, the detector being configured to detect a pulse of the received signal if that pulse is input to the mixer coincident with a pulse of the replica series;
a comparison module configured to compare the time offset between the first and second pulses to a corresponding time offset defined by the protocol so as to determine the relationship between the detected time offset and the corresponding time offset;
a determination module configured to determine expected times of arrival of the time slots of the data portion using the determined relationship and the time offsets defined by the protocol; and
a data reader configured to read data conveyed in the data portion at the expected times of arrival.

2. A receiver as claimed in claim 1, wherein the detector is configured to detect the first and second pulses by detecting a first group of pulses comprising the first pulse and a second group of pulses comprising the second pulse, and wherein the comparison module is configured to compare the time offset between the first and second pulses to a corresponding time offset defined by the protocol by comparing the time offset between the first group of pulses and the second group of pulses to the corresponding time offset defined by the protocol.

3. A receiver as claimed in claim 1, wherein the data reader is configured to read data by virtue of the omission of pulses from one or more of the time slots in the data portion.

4. A receiver as claimed in claim 1, further comprising a signal processor configured to process the signal so as to determine the time-of-arrival of one or more of the pulses.

5. A receiver as claimed in claim 1, wherein the comparison module is configured to compare the time offset between the first and second pulses to a corresponding time offset defined by the protocol by:
determining the offset between a first replica series of pulses that coincides with the first pulse and a second replica series of pulses that coincides with the second pulse; and
comparing the determined offset to the corresponding offset defined by the protocol.

6. A receiver as claimed in claim 1, wherein the replica pulse generator is configured to refine the time e so as to generate a pulse of the replica series of pulses at each of the expected times of arrival of the time slots of the data portion.

7. A receiver as claimed in claim 1, further comprising an integrator configured to integrate successive pulses of the data portion, the data reader being configured to read the integrated data output from the integrator.

8. A receiver as claimed in claim 1, the receiver being a part of a location system for estimating the location of a transmitter of the signal by means of the receiver.

9. A receiver as claimed in claim 2, wherein the data reader is configured to read data by virtue of the omission of pulses from one or more of the time slots in the data portion.

10. A receiver as claimed in claim 2, further comprising a signal processor configured to process the signal so as to determine the time-of-arrival of one or more of the pulses.

11. A receiver as claimed in claim 3, further comprising a signal processor configured to process the signal so as to determine the time-of-arrival of one or more of the pulses.

12. A receiver as claimed in claim 5, wherein the replica pulse generator is configured to refine the time e so as to generate a pulse of the replica series of pulses at each of the expected times of arrival of the time slots of the data portion.

* * * * *